United States Patent [19]

Byford

[11] Patent Number: 4,673,144
[45] Date of Patent: Jun. 16, 1987

[54] SEAT BELT RETRACTOR

[75] Inventor: Trevor K. Byford, Essex, England

[73] Assignee: General Motors Corporation, Detroit, Mich.

[21] Appl. No.: 847,762

[22] Filed: Apr. 3, 1986

[51] Int. Cl.$^4$ .......................... A62B 35/00; G05G 1/00
[52] U.S. Cl. .............................. 242/107.4 C; 74/577 R; 74/577 S
[58] Field of Search ................. 242/107.4 R, 107.4 A, 242/107.4 B, 107.4 C; 74/527, 575, 577 R, 577 S, 577 M; 297/476, 478; 280/806

[56] References Cited

U.S. PATENT DOCUMENTS

| | | | |
|---|---|---|---|
| 3,695,545 | 10/1972 | Peters | 242/107.4 R |
| 3,985,314 | 10/1976 | Booth | 242/107.4 A |
| 4,085,905 | 4/1978 | Linbald | 74/577 S X |
| 4,228,968 | 10/1980 | Jahn | 242/107 |
| 4,351,496 | 9/1982 | Fohl | 242/107.4 A |
| 4,596,310 | 6/1986 | Hatakeyama et al. | 74/577 S X |

FOREIGN PATENT DOCUMENTS 1150064 10/1966 United Kingdom ......... 242/107.4 B
1592713 7/1981 United Kingdom ......... 242/107.4 C Primary Examiner—Stuart S. Levy
Assistant Examiner—David Werner
Attorney, Agent, or Firm—Charles E. Leahy

[57] ABSTRACT

A seat belt reel has a sprocket at each end and a reel shaft extending through elongated slots in a frame to mount the reel for rotation. A rapid unwinding of the belt from the reel imposes a force on the reel and the reel shifts bodily in the direction of belt unwinding. A pawl is pivotally mounted on the frame by a pivot pin and has first and second legs which extend outwardly from the pivot pin and are angularly disposed with respect to each other so as to straddle the sprocket. The bodily shifting movement of the reel carries the sprocket teeth into engagement with one of the pawl legs to stop the rotary movement of the reel. Further bodily shifting movement of the reel pivots the pawl about its pivot pin and thereby carries the other pawl leg into engagement with the sprocket at a point thereon on the other side of the reel shaft.

3 Claims, 3 Drawing Figures

SEAT BELT RETRACTOR

The invention relates to a seat belt retractor and more particularly to a retractor in which the reel is movably mounted on the frame for movement into engagement with a two-legged pawl straddling the reel.

BACKGROUND OF THE INVENTION

Seat belt retractors are conventionally comprised of a belt reel which is rotatably mounted on a frame so that the belt is wound and unwound from the reel upon reel rotation. Furthermore, such retractors conventionally include a locking mechanism which is comprised of a sprocket carried by the reel and engageable by pawl teeth suitably associated with the frame.

In one type of such a locking mechanism, the pawl is pivotally mounted on the frame and is selectively moved into engagement with the sprocket by a pendulum or other sensing device. One example of this type retractor is shown in Fohl U.S. Pat. No. 4,351,496. In other retractors the reel is mounted on the frame in a manner which permits bodily shifting movement of the reel to carry the reel into engagement with locking teeth provided either on the frame itself or on a pawl mounted on the frame. Examples of this type locking device are shown in Peters U.S. Pat. No. 3,695,545 and Jahn U.S. Pat. No. 4,228,968.

SUMMARY OF THE INVENTION

The present invention provides a new and improved seat belt retractor of the type in which the reel is movably mounted on the retractor frame for bodily shifting movement into engagement with a locking pawl.

According to the invention, a retractor frame includes spaced apart side walls having elongated slots. The belt reel has a sprocket at each end and a reel shaft which extends through the slots in the frame side walls to mount the reel for rotation so that a belt attached to the reel is wound and unwound therefrom upon such rotation. Spring means acts between the reel shaft and the frame to urge the reel to a normal position at one end of the elongated aperture. The elongated aperture is generally parallel with the direction of belt unwinding from the reel so that a rapid unwinding of the belt from the reel imposes a force on the reel shaft in the direction opposite to the force imposed by the spring so that the spring is overcome and the reel shifts bodily in the direction of belt unwinding. A pawl is pivotally mounted on the frame by a pivot pin and has first and second legs which extend outwardly from the pivot pin and are angularly disposed with respect to each other so as to straddle the sprocket. The bodily shifting movement of the reel carries the sprocket teeth into engagement with one of the pawl legs to stop the rotary movement of the reel. Further bodily shifting movement of the reel pivots the pawl about its pivot pin and thereby carries the other pawl leg into engagement with the sprocket at a point thereon on the other side of the reel shaft. Thus the two legs of the pawl cooperate to lock the sprocket against any further unwinding rotation with one of the legs being loaded in tension and the other leg being loaded in compression. A spring acts upon the pawl to normally position the pawl at a position in readiness for its engagement by the reel upon the bodily shifting movement of the reel. When the load is removed from the belt the spring means acting on the reel shaft returns the reel along the elongated aperture and thereby withdraws the reel from engagement with the straddling legs of the pawl.

Accordingly, the object, feature and advantage of the invention resides in the provision of a two-legged pawl pivotally mounted on a housing and with the legs thereof straddling the sprocket carried by the reel so that bodily shifting movement of the reel by a belt force acting thereon carries the reel into engagement with the straddling pawl.

Further object, feature and advantage of the invention resides in the provision of a two-legged locking pawl straddling a bodily shiftable reel whereby the pawl is pivotally movable to obtain a simultaneous engagement with near diametrically opposed portions of the sprocket with one leg of the pawl loaded in compression and the other leg of the pawl loaded in tension.

DESCRIPTION OF THE DRAWINGS

These and other features, objects and advantages of the invention will become apparent upon consideration of the appended specification and the drawings in which.

DESCRIPTION OF THE PREFERRED EMBODIMENT

Figure 1:
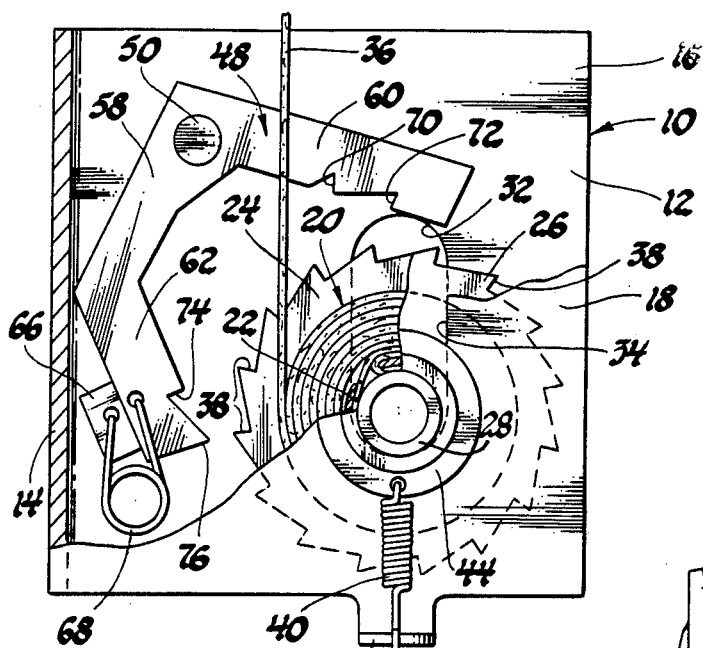
FIG. 1 is a side elevation view of a seat belt retractor according to the invention shown in the unlocked position.

Referring to the drawings, it is seen that the seat belt retractor 10 includes a frame 12 having a base wall 14 and laterally spaced apart side walls 16 and 18.

A belt reel generally indicated at 20 is comprised of a sleeve 22 having a toothed sprocket 24 attached to the end thereof adjacent the housing side wall 16 and another toothed sprocket 26 attached to the end thereof adjacent the side wall 18. A reel shaft 28 extends through the sprockets 24 and 26 and through aligned elongated apertures 32 and 34 provided respectively in the frame side walls 16 and 18. The seat belt 36 is attached to the sleeve 22 and wound about the sleeve. The sprockets 24 and 26 have sprocket teeth 38 displayed around the periphery thereof.

Figure 3:
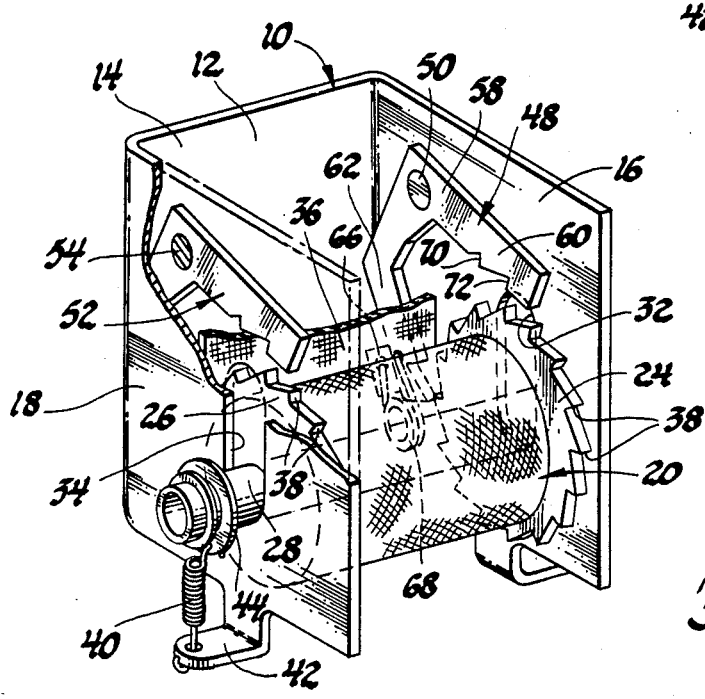
FIG. 3 is a perspective view of the retractor.

The reel 20 is normally held in the position of FIGS. 1 and 3 by a spring 40 having a lower end anchored on a tab 42 struck from the frame side wall 18 and an upper end hooked over a bushing 44 rotatably mounted on the end of the reel shaft 28. The spring 40 and an identical spring, not shown, provided at the other end of the reel shaft, cooperate to maintain the reel 20 at its position shown in FIGS. 1 and 3 where the reel shaft rests at the bottom of the elongated slots 32 and 34.

As best seen in FIG. 3, a pawl 48 is mounted on the frame side wall 16 by a pivot pin 50 and a pawl 52 is mounted on the frame side wall 18 by a pivot pin 54. The pawl 48 is a sheet metal stamping having a central portion 58 through which the pivot pin 50 extends and a pair of legs 60 and 62 which extend outwardly from the central portion 58 and angularly with respect to one another to generally straddle the sprocket 24. The pawl leg 60 has a pair of pawl teeth 70 and 72. The pawl leg 62 has a pair of pawl teeth 74 and 76. The second pawl 52 is constructed the same as the first pawl 48.

As best seen in FIG. 1, the pawl 48 is normally held at a rest position defined by a stop member 66 provided on the frame side wall 16 and a spring 68 which acts between the stop member 66 and pawl legs 62 to urge the pawl legs into engagement with the stop member 66. With the pawl 48 positioned at its normal rest position of FIG. 1, the legs 60 and 62 straddle the sprocket 24 and are spaced therefrom.

In operation, a rapid unwinding of the belt 36 from the reel rotates the reel 20 and its sprockets 24 and 26 in the clockwise direction about the reel shaft 28 and imposes a tangential force on the reel 20 acting in the direction to pull the reel shaft 28 in the upward direction. If the force so imposed exceeds the combined gravitational force and the effect of the spring 40 and its counterpart spring acting on the other end of the reel shaft 28, the reel 20 will move bodily upward along the path defined by the elongated slots 32 and 34.

Figure 2:
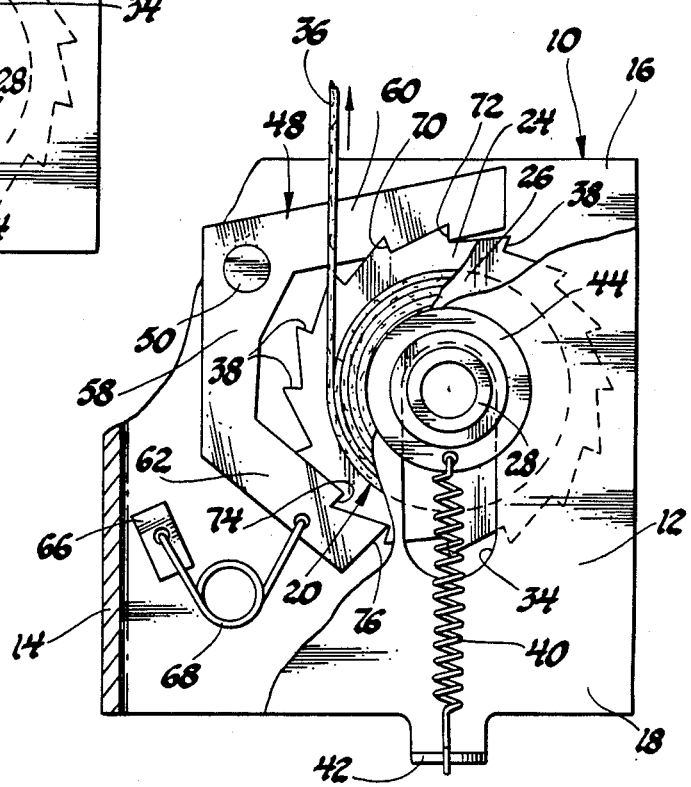
FIG. 2 is a side elevation view similar to FIG. 1 but showing the retractor in the belt locking condition.

As best seen by comparing FIGS. 1 and 2, the upward bodily shifting movement of the reel 20 causes the sprocket teeth 38 to be engaged by the pawl teeth 70 and 72 of the pawl leg 60. Upon such engagement, the reel 20 is locked against further belt unwinding rotation in the clockwise direction. The remaining upward movement of the reel 20 causes the pawl 48 to be pivoted in the counterclockwise direction about its pivot pin 50 so that the pawl teeth 74 and 76 of the pawl leg 62 will be pivoted into engagement with the sprocket teeth 38 as shown in FIG. 2. The pivoting movement of the pawl 48 is permitted by a yielding of the spring 68. Accordingly, as seen in FIG. 2, the pawl legs 60 and 62 straddle the sprocket 24 and lockingly engage with the sprocket teeth 38 on both sides of the axis of rotation defined by the reel shaft 28. The belt unwinding force applied to the belt 36 is withstood by the pawl leg 60 which is loaded in tension and by the pawl leg 62 which is loaded in compression.

It will be appreciated that the fact of the pawl straddling the sprocket and engaging on both sides thereof at nearly diametrically opposed points prevents any possibility of the pawl tooth bouncing off of the sprocket teeth 38, thereby assuring a positive locking engagement between the pawl and the sprocket teeth. Furthermore, it will be appreciated that the fact of the pawl straddling the sprocket and engaging the sprocket at nearly diametrically opposed points thereon effectively and efficiently transmits the belt load between the reel and the frame in a manner dividing the force between the two legs of the pawl and spreading the force over the engagement of several teeth.

When the load is removed from the belt, the spring 40 and its counterpart spring at the other end of the reel cooperate to pull the reel 20 downwardly to its normal position of FIG. 1 in which the sprocket is carried away from the engagement by the pawl and the pawl is enabled to return to its normal rest position of FIG. 1 by the action of the spring 68.

Thus, it is seen that the present invention provides a new and improved seat belt retractor.

The embodiments of the invention in which an exclusive property or privilege is claimed are defined as follows:

1. A seat belt retractor comprising:
a frame;
a reel having a belt wound thereon;
means mounting the reel on the frame for defining an axis of reel rotation to wind and unwind the belt and for defining a path of limited bodily shifting movement of the reel by a predetermined load imposed on the belt;
and locking means adapted to lock said reel against belt unwinding rotation, said locking means including sprocket means carried by the reel for rotary and bodily shifting movement therewith and pawl means pivotally mounted on the frame and adapted to engage with the sprocket means, said pawl means having first and second legs extending angularly outwardly from the pivotal mount thereof and straddling the sprocket means in spaced relation therefrom whereby bodily shifting movement of the reel by the predetermined load imposed on the belt carries the sprocket means into engagement with one of the pawl legs and then the pivotal movement of the pawl and the further movement of the reel cooperate to engage the other leg of the pawl with the sprocket means with one of the legs loaded in compression and the other leg loaded in tension.

2. A seat belt retractor comprising:
a frame having spaced apart walls;
a reel having a toothed sprocket and a reel shaft with a belt wound therearound;
elongated aperture means provided in the spaced apart walls and receiving the reel shaft to mount the reel on the frame to permit reel rotation about an axis to wind and unwind the belt and to permit bodily shifting movement of the reel by a predetermined load imposed on the belt;
and a locking pawl pivotally mounted on the frame and adapted to engage with the sprocket, said locking pawl having a base portion pivotally mounted on the wall and first and second legs extending angularly outwardly from the base portion to straddle the sprocket in spaced relation therefrom whereby bodily shifting movement of the reel by the predetermined load imposed on the belt carries the sprocket into engagement with at least one of the pawl legs to stop the unwinding rotation of the reel and then effect pivotal movement of the pawl upon further bodily shifting movement of the reel to engage the other leg of the pawl with the toothed sprocket whereby the reel is locked against unwinding rotation by pawl engagement with the toothed sprocket on opposite sides of the axis of reel rotation.

3. A seat belt retractor comprising:
a frame having spaced apart walls;
a reel having a toothed sprocket and reel shaft with a belt wound therearound;
elongated aperture means provided in the spaced apart walls and receiving the reel shaft to mount the reel on the frame to permit reel rotation about an axis to wind and unwind the belt and to permit bodily shifting movement of the reel by a predetermined load imposed on the belt;
spring means acting between the reel shaft and the frame to urge the reel shaft to a normal position at an end of the elongated aperture means furthest from the direction of belt payout from the retractor;
a locking pawl pivotally mounted on the frame and adapted to engage with the sprocket, said locking pawl having a base portion pivotally mounted on the wall and first and second legs extending angularly outwardly from the base portion;
means acting to normally position the pawl at a rest position in which the legs thereof are spaced away from the toothed sprockets in straddling relationship therewith;

whereby the imposition of a predetermined load on the belt bodily shifts the reel as permitted by yielding of the spring means, and travel of the reel shaft along the elongated aperture means carries the sprocket into engagement with at least one of the pawl legs to stop the unwinding rotation of the reel and then effect pivotal movement of the pawl upon further bodily shifting movement of the reel to engage the other leg of the pawl with the toothed sprocket whereby the reel is locked against unwinding rotation by pawl engagement with the toothed sprocket on opposite sides of the axis of reel rotation.

* * * * *